Jan. 5, 1926.
T. F. BARTON
1,568,710
VOLTAGE REGULATING SYSTEM
Filed March 30, 1923
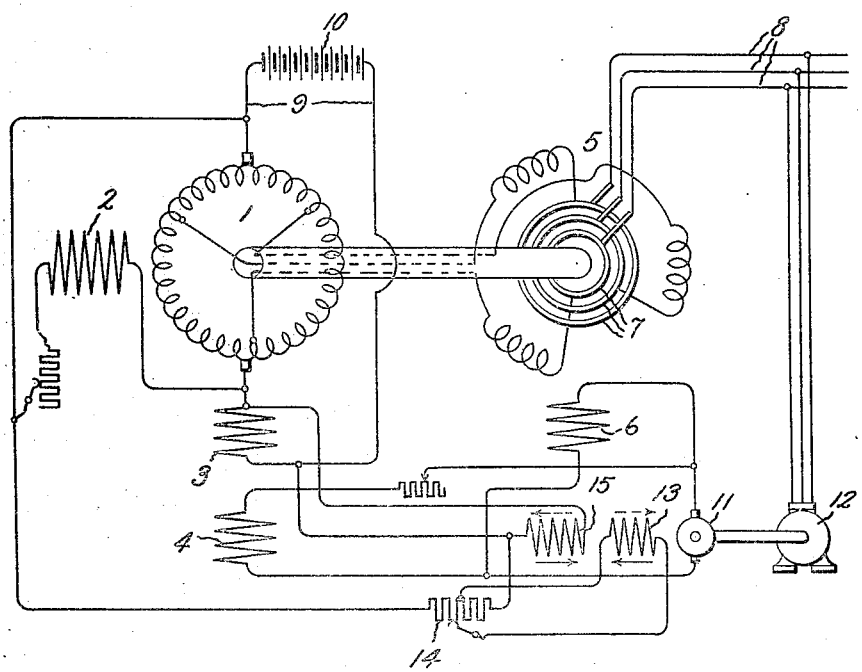
Inventor:
Theophilus F. Barton,
His Attorney.

Patented Jan. 5, 1926.

1,568,710

UNITED STATES PATENT OFFICE.

THEOPHILUS F. BARTON, OF SCHENECTADY, NEW YORK, ASSIGNOR TO GENERAL ELECTRIC COMPANY, A CORPORATION OF NEW YORK.

VOLTAGE-REGULATING SYSTEM.

Application filed March 30, 1923. Serial No. 628,885.

*To all whom it may concern:*

Be it known that I, THEOPHILUS F. BARTON, a citizen of the United States, residing at Schenectady, in the county of Schenectady, State of New York, have invented certain new and useful Improvements in Voltage-Regulating Systems, of which the following is a specification.

My invention relates to voltage regulating systems and particularly to voltage regulating systems for synchronous booster converters.

The voltage regulation of a synchronous booster converter is very small so that its operation is unstable in a system in which the voltage of the supply circuit is variable because a small variation in the supply voltage causes the converter to drop or pick up a considerable load.

One object of my invention is to provide a regulating system for a synchronous booster converter whereby this difficulty is overcome. In accordance with my invention, I provide a regulating arrangement whereby the excitation of the booster is automatically controlled so that it is proportional to the power supplied by the converter and has a direction which depends upon the direction of the output of the converter, and so that it causes the booster to limit the load current supplied by or to the converter.

My invention will be better understood from the following description taken in connection with the accompanying drawing and its scope will be pointed out in the appended claims.

In the drawing which is a diagrammatic view of one embodiment of my invention, I have shown a synchronous converter 1, having a main shunt field winding 2, a series commutating winding 3 and an auxiliary commutating field winding 4. The converter 1 is mechanically connected to a booster 5 having a field winding 6. The booster is shown as being of the synchronous type connected by means of the collector rings 7 to an alternating current supply circuit 8 and having its alternating current windings connected in series with the armature windings of the converter 1. The armature winding of the converter is shown as being connected to the direct current distribution circuit 9 across which is connected a battery 10.

The field winding 6 of the booster may be connected to any suitable source of current, such as an exciter 11 driven by a motor 12 which is connected across the alternating current supply circuit 8. The exciter is provided with a field winding 13 which is connected to any suitable source of voltage which can be varied and reversed. As shown the variable source of voltage comprises a reversing rheostat 14 which is connected across the direct current distribution circuit 9. In order that the field produced by the auxiliary commutating field winding 4 may be varied and reversed simultaneously with the field of the synchronous booster, the field windings 4 and 6 are connected in parallel with each other.

In order to limit the output of the synchronous converter, the excitation of the booster is controlled in accordance with the magnitude and direction of the output of the converter and in such a manner that the booster acts differentially with respect to the load current supplied by the converter. As shown in the drawing, the exciter 11 is provided with a second field winding 15 which is connected in any suitable manner, so that the current through the winding 15 varies in magnitude and direction with the direct current flowing between the synchronous converter and the distribution circuit. As shown, the field winding 15 is connected in parallel with the main commutating field winding 3. The winding 15 is arranged so that, when the converter is supplying current to the distribution circuit, it causes the booster 5 to lower the alternating current voltage impressed upon the armature winding of the converter as the direct current supplied by the converter increases, and when the converter is operating as an inverted converter the booster operates to lower the voltage impressed across the alternating current circuit 8 as the direct current supplied to the converter increases.

This regulating arrangement therefore gives the converter a differential voltage characteristic under all conditions.

The operation of the arrangement shown is as follows:—

The rheostat 14 is adjusted by hand or otherwise to compensate for the changes in the exciter voltage, produced by gradual changes in the load supplied by the converter, so that the voltage of the direct current distribution circuit 9 is maintained at the proper value. If, however, a sudden change in the voltage of the alternating current supply circuit occurs, and the converter is not provided with suitable regulating means, a considerable load is thrown on or off the converter before the rheostat 14 can be adjusted. The regulating arrangement shown, however, operates under these conditions to limit the load thrown on or off the converter. Let it be assumed that when the rheostat 14 is adjusted so that the booster 5 is boosting the alternating current voltage impressed on the converter, the voltage of the alternating current supply circuit 8 suddenly increases so that the direct current voltage of the converter increases, and therefore the current supplied to the distribution circuit 9 increases. This increase in the current supplied to the distribution circuit, increases the excitation of the field winding 15 of the exciter 11. Assuming that the magneto-motive force set up by the current through the winding 13 is in the direction of the solid arrow shown below the winding, the direction of the magneto-motive force set up by the current through the field winding 15 under the above conditions, is in the direction of the solid arrow shown below the field winding so that the excitation of the exciter 11 decreases as the direct current supplied by the converter increases. Therefore the excitation of the booster 5 decreases so that the alternating current voltage impressed upon the converter and the direct current voltage of the converter decrease as the direct current supplied by the converter increases. Therefore it is evident that an increase in the direct current supplied by the converter, produced by an increase in the voltage of the alternating current supply circuit, decreases the direct current voltage of the converter.

Let it now be assumed when the rheostat 14 is adjusted so that the booster 5 is boosting the alternating current voltage impressed on the converter, the voltage of the alternating current supply circuit suddenly decreases so that the direct current voltage of the converter and the direct current supplied by the converter decrease. The decrease in the direct current supplied by the converter decreases the current through the field winding 15 which at this time is acting differentially with respect to the field winding 13 so that the excitation of the exciter 11 increases. Therefore the excitation of the booster increases so that the boosting effect of the booster is increased. Consequently it is evident that a decrease in the direct current supplied by the converter produced by a decrease in the alternating current supply voltage increases the direct current voltage of the converter.

If while the booster is boosting the alternating current voltage impressed on the converter the alternating current voltage drops to such a value that the direct current voltage of the converter is less than the voltage of the battery 10, the converter operates as an inverted converter to supply current to the alternating current circuit 8. Under these conditions, the current through the field winding 15 reverses so that the magneto-motive force set up by the current through the winding 15 is in the direction of the broken arrow shown above the winding 15. The windings 13 and 15 now act accumulatively so that the booster operates as a bucker to lower the voltage impressed on and consequently limit the current supplied to the alternating current circuit 8 by the converter.

It is therefore evident that my regulating arrangement operates equally as well to limit the alternating current supplied to the alternating current circuit 8 when the converter is operated as an inverted converter as it does to limit the direct current supplied to the distribution circuit 9 when the converter is operating as an ordinary converter.

It is apparent that the operation is the same when the rheostat 14 is adjusted so that under normal voltage conditions, the booster 5 is bucking the alternating current supply voltage. Under these conditions the direction of the magneto-motive force produced by the current through the winding 13, is in the direction of the broken arrow shown above the winding. Therefore since the magneto-motive forces set up by the currents through the windings 13 and 15 are in the same direction when the converter is supplying current to the distribution current, an increase in the current supplied to the distribution circuit by the converter increases the excitation of the booster and consequently increases the bucking effect of the booster so as to lower the direct current voltage of the converter and consequently limit the current supplied by the converter. A decrease in the current supplied to the distribution circuit by the converter decreases the excitation of the booster and consequently the bucking effect thereof so that the direct current voltage of the converter increases. A reversal of the current between the converter and the distribution circuit causes the current through the field winding 15 to reverse so that windings 13 and 15 act differentially so that the booster 5 operates to lower the voltage impressed on and therefore to limit the current supplied to the alternating current circuit 8 by the converter.

From the above description it is evident that the voltage of the booster 5 is automatically regulated so that the direct current voltage of the converter varies inversely with the direct current supplied by the converter when the converter is operating to supply current to the distribution circuit, and when the converter is operating as an inverted converter, the booster is automatically regulated so that the alternating current voltage impressed upon the alternating current supply circuit varies inversely with the load supplied by the converter.

While I have shown and described one embodiment of my invention, I do not desire to be limited to the exact arrangement shown and described, but seek to cover in the appended claims all those modifications that fall within the true spirit and scope of my invention.

What I claim as new and desire to secure by Letters Patent of the United States is:

1. In combination, an alternating current supply circuit, a direct current distribution circuit, a synchronous converter connected between said circuits, a booster electrically connected in series between said supply circuit and said converter, and means whereby such booster operates differentially with respect to the output of said converter comprising means for controlling the excitation of said booster in accordance with the magnitude and direction of the power flowing between said converter and one of said circuits.

2. In combination, an alternating current supply circuit, a direct current distribution circuit, a synchronous converter connected between said circuits, a booster electrically connected in series between said supply circuit and said converter, and a field winding for said booster connected and arranged so that the current through said winding varies in accordance with the direction and magnitude of the current flowing between said converter and said distribution circuit and in such a manner that said booster operates differentially with respect to the load current supplied by said converter.

3. In combination, an alternating current supply circuit, a direct current distribution circuit, a synchronous converter connected between said circuits, a booster electrically connected in series between said supply circuit and said converter, and means whereby the alternating current voltage impressed upon said converter varies inversely with the current supplied to said distribution circuit by said converter comprising means for controlling the excitation of said booster.

4. In combination, an alternating current supply circuit, a direct current distribution circuit, a synchronous converter connected between said circuits, a booster electrically connected in series between said supply circuit and said converter, means for controlling the excitation of said booster comprising two field windings, one of said field windings being connected and arranged so that the current through it varies in accordance with the direction and magnitude of the current flowing between said converter and said distribution circuit and in such a manner that said booster acts differentially with respect to the load current supplied by said converter, and means operative to vary and reverse the current through the other one of said windings.

5. In combination, an alternating current supply circuit, a direct current distribution circuit, a synchronous converter connected between said circuits, a booster electrically connected in series between said supply circuit and said converter, an exciter for said booster provided with two field windings, one of said field windings being connected and arranged so that the current through it varies in accordance with the direction and magnitude of the current flowing between said converter and said distribution circuit and in such a manner that said booster acts differentially with respect to the load current supplied by said converter, and means operative to vary and reverse the current through the other one of said field windings.

6. In combination, an alternating current supply circuit, a direct current distribution circuit, a synchronous converter connected between said circuits, a booster mechanically connected to said converter and electrically connected in series between said supply circuit and said converter, a commutating field winding for said converter, an exciter for said booster and said commutating field winding, and a field winding for said exciter connected and arranged so that the current through it varies in accordance with the direction and magnitude of the current flowing between said converter and said distribution circuit and in such a manner that said booster acts differentially with respect to the load current supplied by said converter.

7. In combination, an alternating current supply circuit, a direct current distribution circuit, a synchronous converter connected between said circuits and provided with a series commutating winding, a booster mechanically connected to said converter and electrically connected in series between said supply circuit and said converter, a field winding for said booster, an exciter for said booster field winding, an auxiliary commutating field winding for said converter connected in series with said booster field winding and said exciter, two field windings for said exciter, one of said field windings being connected in parallel with said series commutating winding and arranged so as to cause said booster to act differentially with respect to the load current supplied by said converter, and means operative to vary and reverse the current through the other one of said exciter field windings.

In witness whereof, I have hereunto set my hand this 29th day of March, 1923.

THEOPHILUS F. BARTON.